(12) United States Patent
Weinberg (10) Patent No.: US 11,420,266 B2
(45) Date of Patent: Aug. 23, 2022

(54) INTERCHANGEABLE CUTTING INSERTS AND METHODS ASSOCIATED WITH THE SAME

(71) Applicant: ILLINOIS TOOL WORKS INC., Glenview, IL (US)

(72) Inventor: Jeremy E. Weinberg, Oak Park, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/659,839

(22) Filed: Jul. 26, 2017

(65) Prior Publication Data

US 2017/0320140 A1   Nov. 9, 2017

Related U.S. Application Data

(62) Division of application No. 14/527,141, filed on Oct. 29, 2014, now abandoned.

(51) Int. Cl.
*B23B 5/16* (2006.01)
*B23B 27/06* (2006.01)
(Continued)

(52) U.S. Cl.
CPC ............... *B23B 5/167* (2013.01); *B23B 3/26* (2013.01); *B23B 5/161* (2013.01); *B23B 27/06* (2013.01);
(Continued)

(58) Field of Classification Search
CPC ........... B23B 5/167; B23B 3/26; B23B 5/161; B23B 27/06; B23B 27/145; B23B 5/163;
(Continued)

(56) References Cited

U.S. PATENT DOCUMENTS 1,459,805 A    6/1923    Tasker
1,838,520 A    12/1931   Archer
(Continued)

FOREIGN PATENT DOCUMENTS

CA    2568404 A1    5/2007
CH    480117 A      10/1969
(Continued)

OTHER PUBLICATIONS

English translation of KR 20140090360 A, Jul. 2014.*
(Continued)

*Primary Examiner* — Alan Snyder
(74) *Attorney, Agent, or Firm* — Klintworth & Rozenblat IP LLP (57) ABSTRACT

A cutting insert configured to couple to a pipe machining apparatus is provided and includes a first cutting edge and a second cutting edge opposite the first cutting edge. A pipe cutting assembly is provided and includes a first base, a second base separate from the first base, and a cutting insert interchangeably couplable to the first base and the second base to perform a first cut with the cutting insert coupled to the first base and a second cut with the cutting insert coupled to the second base. A pipe machining apparatus is provided and includes a tool support, a first cutting tool base and a second cutting tool base interchangeably coupled to the tool support, and a cutting insert interchangeably coupled to the first cutting tool base and the second cutting tool base.

11 Claims, 7 Drawing Sheets

(51) Int. Cl.
    *B23B 3/26* (2006.01)
    *B23B 27/14* (2006.01)

(52) U.S. Cl.
    CPC ............ *B23B 27/145* (2013.01); *B23B 5/163* (2013.01); *B23B 2200/0447* (2013.01); *B23B 2200/3627* (2013.01); *B23B 2205/10* (2013.01); *B23B 2210/02* (2013.01); *B23B 2215/72* (2013.01); *B23B 2220/04* (2013.01); *B23B 2220/28* (2013.01)

(58) Field of Classification Search
    CPC .... B23B 2200/0447; B23B 2200/3627; B23B 2215/72; B23B 2220/04; B23B 2220/28
    See application file for complete search history.

(56) References Cited

U.S. PATENT DOCUMENTS

| | | | |
|---|---|---|---|
| 2,201,183 A | 5/1940 | Kelley | |
| 2,363,160 A | 11/1944 | Sundstrom | |
| 2,598,581 A | 5/1952 | Mckenna | |
| 2,734,256 A | 2/1956 | Forward et al. | |
| 2,800,703 A | 7/1957 | Buettner | |
| 3,084,416 A | 4/1963 | Broughton | |
| 3,097,417 A | 7/1963 | Hill | |
| 3,136,031 A | 6/1964 | Cassidy | |
| 3,176,377 A | 4/1965 | Milewski et al. | |
| 3,286,562 A | 11/1966 | Curran | |
| 3,339,256 A | 9/1967 | Melinder | |
| 3,359,612 A | 12/1967 | Mina | |
| 3,545,060 A | 12/1970 | Kezran | |
| 3,546,759 A | 12/1970 | Sirola | |
| 3,595,107 A | 7/1971 | Dackow | |
| 3,707,747 A | 1/1973 | Falk | |
| 3,848,303 A | 11/1974 | Faber | |
| 4,340,324 A | 7/1982 | McCreery | |
| 4,367,990 A | 1/1983 | Porat et al. | |
| 4,486,131 A | 12/1984 | Eckle | |
| 4,739,685 A * | 4/1988 | Ricci | B23B 3/26 82/113 |
| 4,919,573 A | 4/1990 | Tsujimura | |
| 4,940,369 A | 7/1990 | Aebi et al. | |
| 5,054,342 A * | 10/1991 | Swiatowy | B23B 5/163 82/113 |
| 5,082,401 A | 1/1992 | Niebauer | |
| 5,503,507 A | 4/1996 | Lowe et al. | |
| 5,893,683 A | 4/1999 | Johnson | |
| 6,079,302 A | 6/2000 | Gudleske | |
| 6,409,435 B1 | 6/2002 | Kocherovsky | |
| 7,090,444 B1 | 8/2006 | Craig | |
| 7,104,171 B1 * | 9/2006 | Long | B23B 29/26 407/11 |
| 7,273,335 B2 | 9/2007 | Furuhashi | |
| 7,300,232 B2 | 11/2007 | Wiman | |
| 9,050,669 B2 | 6/2015 | Coakley | |
| 9,352,396 B2 | 5/2016 | Hankey | |
| 10,384,270 B1 | 8/2019 | Quinn | |
| 2002/0114674 A1 | 8/2002 | Hansson | |
| 2003/0113176 A1 | 6/2003 | Kress | |
| 2005/0152753 A1 | 7/2005 | DeRoche | |
| 2006/0083594 A1 | 4/2006 | Ejderklint | |
| 2006/0147280 A1 | 7/2006 | Sjogren et al. | |
| 2007/0098509 A1 | 5/2007 | Hall | |
| 2007/0177951 A1 | 8/2007 | Sakamoto | |
| 2009/0052999 A1 | 2/2009 | Phillips, II | |
| 2010/0150671 A1 | 6/2010 | Oprasic | |
| 2010/0162860 A1 | 7/2010 | Hall | |
| 2011/0219920 A1 | 9/2011 | Amemann | |
| 2012/0230784 A1 | 9/2012 | Hoefler | |
| 2013/0239762 A1 * | 9/2013 | Place | B23B 3/26 82/113 |
| 2014/0096398 A1 | 4/2014 | Coakley | |
| 2014/0096663 A1 | 4/2014 | Coakley | |
| 2015/0053055 A1 * | 2/2015 | Schammel | B23B 3/26 83/39 |
| 2015/0107425 A1 | 4/2015 | Walton | |
| 2019/0022764 A1 | 1/2019 | Hecht | |

FOREIGN PATENT DOCUMENTS

| | | | |
|---|---|---|---|
| CH | 569539 A5 | 11/1975 | |
| CH | 570840 A5 | 12/1975 | |
| CH | 705289 A2 | 1/2013 | |
| DE | 10 54 805 B | 4/1959 | |
| DE | 1477396 A1 | 3/1970 | |
| DE | 2363660 A1 | 6/1975 | |
| DE | 2848126 A1 | 4/1980 | |
| DE | 3128121 A1 | 2/1983 | |
| DE | 3714055 | 11/1987 | |
| DE | 102008006262 A1 | 8/2009 | |
| DE | 10 2009 040840 A1 | 3/2011 | |
| DE | 202015000913 U1 * | 5/2016 | ............ B23B 5/167 |
| DE | 102016103565 A1 | 8/2017 | |
| EP | 0787551 A2 | 8/1997 | |
| EP | 1240961 A1 | 9/2002 | |
| EP | 1 321 210 A2 | 6/2003 | |
| EP | 1375038 A1 | 1/2004 | |
| EP | 1470878 A1 | 10/2004 | |
| EP | 2186583 A2 | 5/2010 | |
| FR | 1271781 A * | 9/1961 | ......... B23B 27/1633 |
| FR | 1598540 A | 7/1970 | |
| GB | 810512 A * | 3/1959 | ............ B23B 27/08 |
| GB | 1099961 A | 1/1968 | |
| KR | 20140090360 A * | 7/2014 | ............... G21C 3/06 |
| SU | 1634394 A1 * | 3/1991 | |
| WO | 9317821 A1 | 9/1993 | |
| WO | 9612584 A1 | 5/1996 | |
| WO | 2005092545 A1 | 10/2005 | |
| WO | 2011031754 A1 | 3/2011 | |

OTHER PUBLICATIONS

English translation of FR 1271781, Sep. 1961 (Year: 1961).*
http://www.ehwachs .com/resources/pdf/proddatasheet-20131121133500.pdf, DuoEdge Insert Tooling, Jan. 1, 2013, 2 pages.
International Search Report and Written Opinion for PCT/US2015/043356 dated Jan. 7, 2016, 16 pages.
European Search Report for EP 17 20 3518 dated Mar. 9, 2018, 9 pages.
International Search Report and Written Opinion for PCT Application No. PCT/US2018/043244 dated Nov. 6, 2018, 12 pages.
Office Action issued in European Patent Application No. 17203518.0 dated Jun. 16, 2020, 8 pages.

* cited by examiner

INTERCHANGEABLE CUTTING INSERTS AND METHODS ASSOCIATED WITH THE SAME

RELATED APPLICATIONS

The present application is a divisional of co-pending U.S. Non-Provisional patent application Ser. No. 14/527,141, filed Oct. 29, 2014, which is incorporated by reference herein.

FIELD OF THE INVENTION

The present disclosure generally relates to pipe machining apparatuses and cutting tools and, more particularly, to pipe machining apparatuses and cutting tools including cutting inserts.

BACKGROUND

Pipe machining apparatuses are capable of machining objects, such as pipes, in a variety of different manners. In some manners, pipes are cut along a plane perpendicular to a longitudinal axis of the pipe, thereby provided a flat-cut end of the pipe. In other manners, pipes may be cut with a bevel along an axis or plane transverse to a longitudinal axis of the pipe. Pipe machining apparatuses may also include multiple cutting tools for cutting multiple bevels into a pipe. For example, when a pipe is cut, it is cut into two pieces. In such an example, the pipe machining apparatus may include a first cutting tool to bevel an end of the first cut piece of pipe and a second cutting tool to bevel an end of the second cut piece of pipe.

Pipe machining apparatuses may also be capable of cutting bevels into the ends of the pipe at multiple angles. Thus, a large variety of cutting tools are required to provide the variety of bevel cuts. A user would be required to keep track of the large variety of tools, which can be cumbersome and the possibility of losing one or more cutting tools is high. Moreover, due to the types of objects cut and the conditions in which the pipe machining apparatus operates, cutting tools must be made of durable and expensive material. Thus, such cutting tools are expensive. Expensive cutting tools combined with the requirement of maintaining large quantities of tools in order to perform the wide variety of bevel cuts results in an expensive endeavor. Additionally, losing and damaging cutting tools results in expensive replacement of the cutting tools.

SUMMARY

Thus, a need exists for a cutting tool that resolves one or more of the above-referenced issues or other issues that exist with cutting objects.

The present disclosure is defined by the following claims, and nothing in this section should be taken as a limitation on those claims.

In one aspect, a cutting insert configured to be coupled to a pipe machining apparatus to cut a pipe is provided. The cutting insert includes a first cutting edge, a second cutting edge opposite the first cutting edge, a third edge extending between the first cutting edge and the second cutting edge, and a fourth edge opposite the third edge and extending between the first cutting edge and the second cutting edge.

In one aspect, the first cutting edge and the second cutting edge are generally parallel to each other.

In one aspect, the third edge and the fourth edge are generally parallel to each other.

In one aspect, the first cutting edge and the second cutting edge are not perpendicular to the third and fourth edges.

In one aspect, the cutting insert further includes a coupling aperture defined through the cutting insert.

In one aspect, the cutting insert is configured to be coupled to a base of a cutting tool in a first orientation, in which the first cutting edge is positioned to cut a pipe, and a second orientation, in which the second cutting edge is positioned to cut a pipe.

In one aspect, the third edge is configured to engage the base with the cutting insert in the first orientation and the fourth edge is configured to engage the base with the cutting insert in the second orientation.

In one aspect, a pipe cutting assembly is provided and includes a first base, a second base separate from the first base, and a cutting insert including a cutting edge configured to cut a pipe. The cutting insert interchangeably couples to the first base and the second base. The cutting insert is configured to perform a first cut with the cutting insert coupled to the first base and a second cut with the cutting insert coupled to the second base. The first cut is different than the second cut.

In one aspect, the first cut is a first bevel cut at a first angle and the second cut is a second bevel cut at a second angle different than the first angle.

In one aspect, the first angle is about 30 degrees and the second angle is about 37.5 degrees.

In one aspect, the first base includes a first coupling aperture, the second base includes a second coupling aperture and the cutting insert includes an insert aperture. The pipe cutting assembly further includes a coupling member interchangeably insertable into the insert aperture and the first coupling aperture when aligned to interchangeably couple the cutting insert to the first base, and the insert aperture and the second coupling aperture when aligned to interchangeably couple the cutting insert to the second base.

In one aspect, the first base includes a first lip and a first surface on the first lip. The second base includes a second lip and a second surface on the second lip. The cutting insert engages the first surface on the first lip when coupled to the first base and engages the second surface on the second lip when coupled to the second base.

In one aspect, the first surface extends at a first angle and the second surface extends at a second angle different than the first angle. The cutting edge is orientated at a first cutting angle with the cutting insert coupled to the first base and at a second cutting angle with the cutting insert coupled to the second base.

In one aspect, the cutting edge is a first cutting edge and the cutting insert further includes a second cutting edge.

In one aspect, the cutting insert is made of a first material and at least one of the first base and the second base is made of a second material different than the first material.

In one aspect, a pipe machining apparatus is provided and includes a frame, a tool carrier moveably coupled to the frame, a tool support coupled to and moveable with the tool carrier, a first cutting tool base configured to be coupled to the tool support, and a second cutting tool base configured to be coupled to the tool support. The first cutting tool base and the second cutting tool base are interchangeably coupled to the tool support. The pipe machining apparatus also includes a cutting insert interchangeably coupled to the first cutting tool base and the second cutting tool base. The cutting insert includes a cutting edge. The cutting insert is oriented in a first orientation to perform a first cut with the cutting insert coupled to the first cutting tool base and in a second orientation to perform a second cut with the cutting insert coupled to the second cutting tool base. The first cut is different than the second cut.

In one aspect, the first cut is a first bevel cut at a first angle and the second cut is a second bevel cut at a second angle different than the first angle.

In one aspect, the first angle is about 30 degrees and the second angle is about 37.5 degrees.

In one aspect, the first cutting tool base includes a first lip and a first surface on the first lip. The second cutting tool base includes a second lip and a second surface on the second lip. The cutting insert engages the first surface on the first lip when coupled to the first cutting tool base and engages the second surface on the second lip when coupled to the second cutting tool base.

In one aspect, the first surface extends at a first angle and the second surface extends at a second angle different than the first angle. The cutting edge is orientated at a first cutting angle with the cutting insert coupled to the first cutting tool base and at a second cutting angle with the cutting insert coupled to the second cutting tool base.

In one aspect, the cutting edge is a first cutting edge and the cutting insert further includes a second cutting edge.

In one aspect, the cutting insert is made of a first material and at least one of the first cutting tool base and the second cutting tool base is made of a second material different than the first material.

In one aspect, the first cutting tool base defines a first coupling aperture, the second cutting tool base defines a second coupling aperture, and the cutting insert defines an insert aperture. The pipe machining apparatus further includes a coupling member interchangeably insertable into the insert aperture and the first coupling aperture when aligned to interchangeably couple the cutting insert to the first cutting tool base and into the insert aperture and the second coupling aperture when aligned to interchangeably couple the cutting insert to the second cutting tool base.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
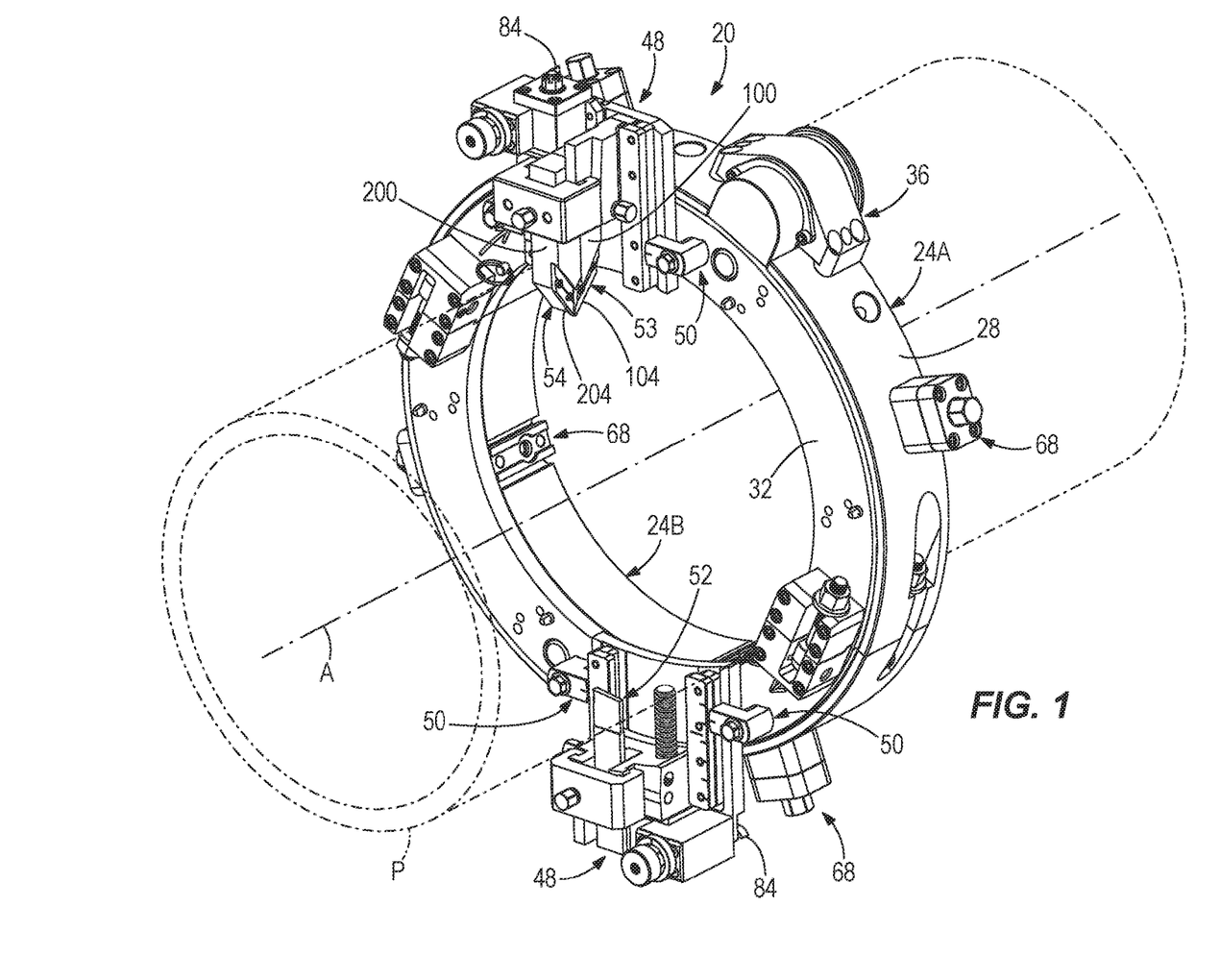
FIG. 1 is a perspective view of one example of a pipe machining apparatus configured to cut an object, such as a pipe, and includes one example of cutting tools, according to one aspect of the present disclosure.

With reference to FIG. 1, there is shown one example of a pipe machining apparatus 20 configured to machine pipes P of varying diameters. In some examples, the apparatus 20 completely cuts through pipes P. In other examples, the apparatus 20 prepares an end of a pipe P for coupling to another pipe. In still other examples, the apparatus 20 both completely cuts and prepares a pipe P for coupling to another pipe. In these examples, cutting and/or preparing an end of a pipe P may result in a cut end of the pipe P being cut along a plane generally perpendicular to a longitudinal axis A of the pipe P or cut along a plane transverse to the longitudinal axis A of the pipe P. In some examples, cutting an end of the pipe P along a transverse plane may be referred to as a bevel cut and result in a beveled end of the pipe P. Beveled ends of a pipe may be cut along a wide variety of transverse planes and at a wide variety of angles relative to the longitudinal axis A of the pipe P. In some examples, the beveled ends may be cut along a plane that is traverse to the longitudinal axis A of the pipe at about a 30 degree angle. In other examples, the beveled ends may be cut along a plane that is traverse to the longitudinal axis A of the pipe at about a 37.5 degree angle. These examples of beveled ends, planes and angles are not intended to be limiting upon the present disclosure, but are rather provided to demonstrate at least some of the principles of the present disclosure.

In the illustrated example, the pipe machining apparatus 20 is formed of two joined-together semicircular sections 24A, 24B and includes a frame 28 and a tool carrier 32. The two sections 24A, 24B together comprise the frame 28 and the tool carrier 32 such that a first portion of the frame 28 and a first portion of the tool carrier 32 are included in one section 24A and a second portion of the frame 28 and a second portion of the tool carrier 32 are included in the other section 24B. In the illustrated example, the frame 28 has a column 36 extending outwardly of the two semicircular sections 24A, 24B and houses a pinion gear configured to couple with a suitable drive motor, such as, for example, an air motor, with suitable gear reduction means. The frame 28 is configured to couple and be fixed relative to a pipe P, and the tool carrier 32 is rotatable relative to the fixed frame 28 and the pipe P. The motor is configured to rotate the tool carrier 32 relative to the frame 28 through a gear train in the column 36.

The rotatable tool carrier 32 includes one or more tool supports 48 (two tool supports 48 shown in the illustrated example), which support tools 52, 53, 54 for performing cutting or machining operations on the pipe P as the tools 52, 53, 54 rotate circumferentially about the pipe P. The tool supports 48 are coupled to the tool carrier 32 by a plurality of coupling members 50. The machining operation performed by the tool 52 may form a straight edge generally perpendicular to a longitudinal axis A of the pipe P. The tools 53, 54 may form bevels on ends 56, 58 of the two cut pieces P1, P2 of the pipe P that are along planes 60, 62 transverse to the longitudinal axis A of the pipe P. The transverse planes 60, 62 may be at any angle relative to the longitudinal axis A of the pipe P other than ninety degrees. For purposes of demonstrating principles of the present disclosure, the transverse planes 60, 62 will be described as being at about 30 degrees from perpendicularity to the longitudinal axis A of the pipe P or at about 37.5 degrees from perpendicularity to the longitudinal axis A of the pipe P.

In the illustrated example, the apparatus 20 includes four adjustable clamp members or coupling members 68 engageable with an exterior of the pipe P and having suitable adjustability to couple and concentrically locate the apparatus 20 to the pipe P.

One or more projections may be adjustably movable into and out of a path of an advancement member 84 coupled to each tool support 48 to advance the tools 52, 53, 54 toward the pipe P. The apparatus 20 may include any number of projections for engaging advancement members 84.

Figure 2:
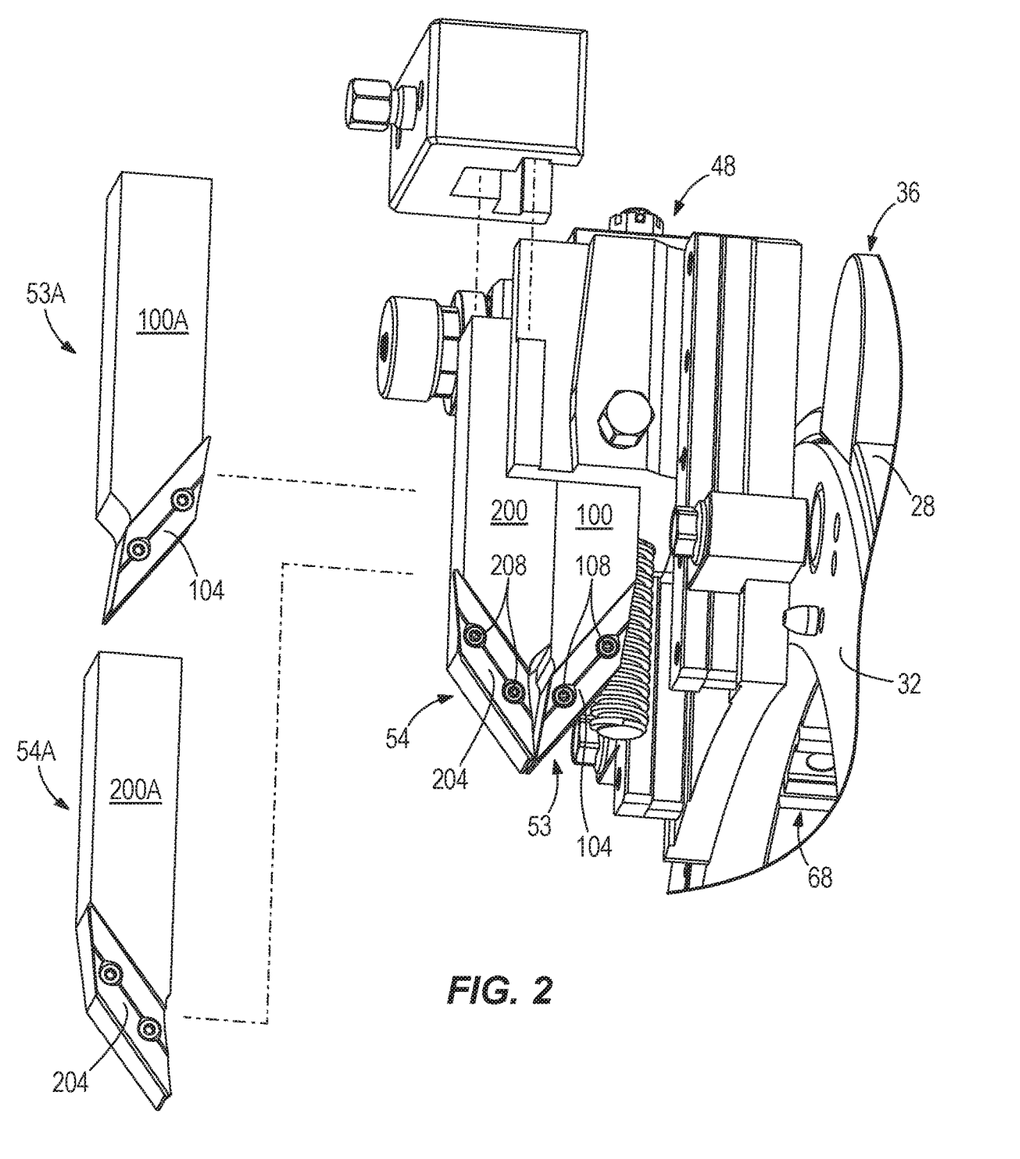
FIG. 2 is an enlarged perspective view of a portion of the pipe machining apparatus shown in FIG. 1 with examples of interchangeable cutting tools, according to one aspect of the present disclosure.
Figure 3:
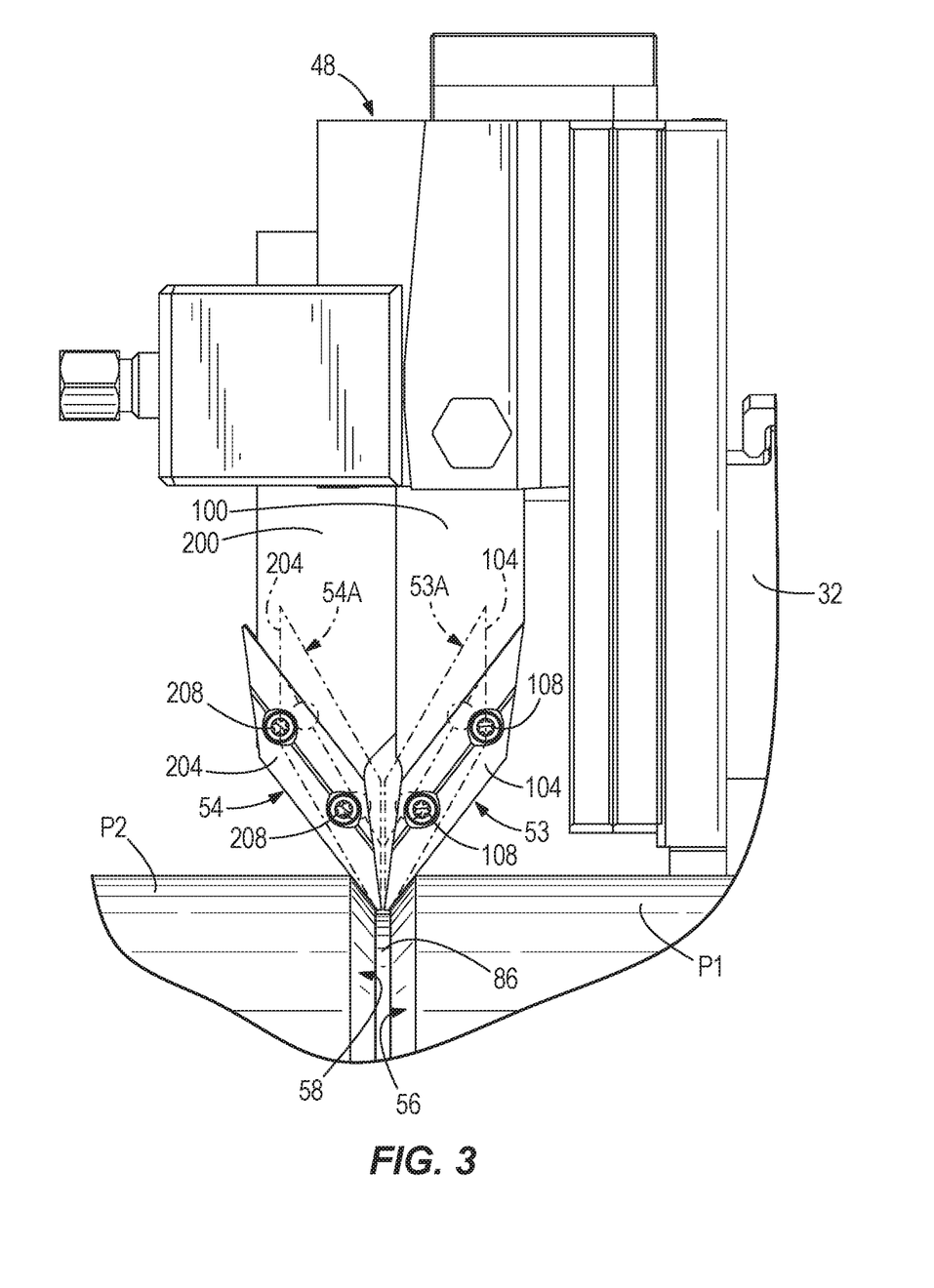
FIG. 3 is an elevational view of one example of cutting tools shown in solid and another example of cutting tools shown in dashed with the various cutting tools being interchangeable, according to one aspect of the present disclosure.

With continued reference to FIG. 1 and further reference to FIGS. 2 and 3, tools 53 and 54 will be described in further detail. Tool 52 cuts a groove 86 into the pipe P and tools 53, 54 are configured to bevel ends 56, 58 of cut pieces P1, P2 of a pipe P at desired angles. The tool 53 bevels an end 56 of a first cut piece P1 of pipe and tool 54 bevels an end 58 of a second cut piece P2 of pipe. In the illustrated example, the tool support 48 supports both tools 53, 54 for beveling ends 56, 58 of both cut pieces P1, P2 of a pipe. In other examples, the tool support 48 may only support tool 53 for beveling an end 56 of the first cut piece P1 of pipe and the end 58 of the second cut piece P2 of pipe will not be beveled. In further examples, the tool support 48 may only support tool 54 for beveling an end 58 of the second cut piece P2 of pipe and the end 56 of the first cut piece P1 of pipe will not be beveled.

In the illustrated example, tools 53, 54 cut bevels along planes 60, 62 that are transverse to the longitudinal axis A of the pipe and at about 37.5 degrees from perpendicularity to the longitudinal axis A. Tools 53, 54 may be interchangeable with other tools that cut bevels along planes that are transverse to the longitudinal axis A of the pipe and at different angles from perpendicularity to the longitudinal axis A. For example, as illustrated in dashed lines, tools 53A, 54A may be interchanged with tools 53, 54 and may bevel ends 56, 58 of the two cut pieces P1, P2 of pipe at about 30 degrees from perpendicularity to the longitudinal axis A of the pipe.

Figure 4:
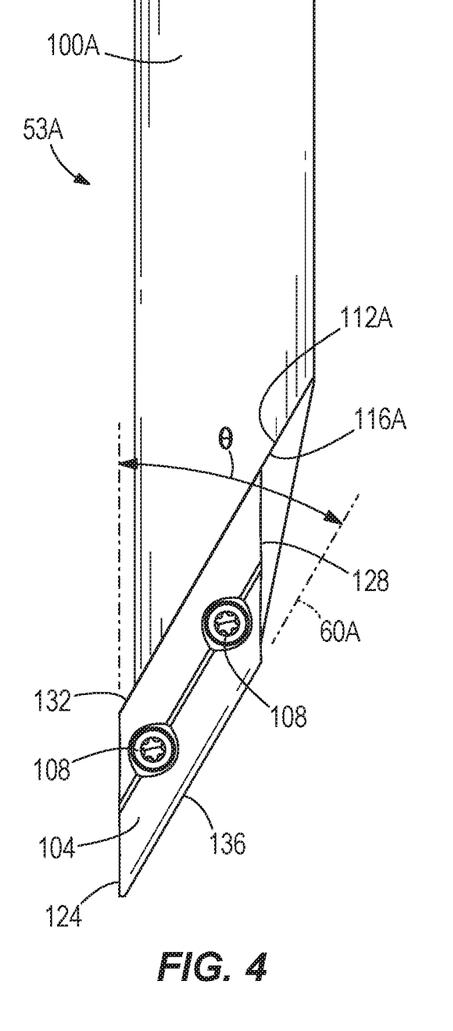
FIG. 4 is an elevational view of one example of a cutting tool configured to be included in the pipe machining apparatus shown in FIG. 1, according to one aspect of the present disclosure.

Referring now to FIG. 4, the tool 53A is illustrated and is configured to bevel an end 56 of a first cut piece P1 of the pipe. In some examples, the bevel cut into the end 56 of the first cut piece P1 of pipe may be referred to as an inside bevel and tool 53A may be referred to as an inside bevel tool. In the illustrated example, the tool 53A includes a base 100A and a cutting insert 104 coupled to the base 100A. The cutting insert 104 may be coupled to the base 100A in a variety of manners and all of such manners are intended to be within the spirit and scope of the present disclosure. In the illustrated example, the cutting insert 104 is coupled to the base 100A with two coupling members or fasteners 108. In other examples, the cutting insert 104 may be coupled to the base 100A using any number of fasteners and all of such possibilities are intended to be included in the spirit and scope of the present disclosure. The base 100A defines a projection or lip 112A having an engagement surface 116A that is configured to be engaged by the cutting insert 104. The base 100A also defines coupling apertures 120A therein configured to receive the coupling members 108 therein. Similarly to the alternative examples associated with the coupling members 108, the base 100A may include any number of coupling apertures 120A to correspond to the number of coupling members 108.

With continued reference to FIG. 4, the cutting insert 104 includes a first cutting edge 136, a second cutting edge 132 positioned opposite the first cutting edge 136, and third and fourth edges 124, 128 opposite each other and between the first and second cutting edges 136, 132. In the illustrated example, the first and second cutting edges 136, 132 are generally parallel to each other and the third and fourth edges 124, 128 are generally parallel to each other. In other examples, the edges of the cutting insert 104 may be oriented differently relative to each other and all of such possibilities are intended to within the spirit and scope of the present disclosure. The cutting insert 104 also defines apertures 140 there through that are alignable with coupling apertures 120A defined in the base 100A. The coupling members 108 are positioned in the aligned apertures 120A, 140 therein to couple the insert 104 to the base 100A. Similarly to the alternative examples associated with the coupling members 108 and coupling apertures 120A of the base 100A, the cutting insert 104 may include any number of apertures 140 to correspond to the number of coupling members 108 and coupling apertures 120A in the base 100A.

In the illustrated example, the second cutting edge 132 of the cutting insert 104 engages the engagement surface 116A of the base 100A. The lip 112A, the engagement surface 116A, the location of the coupling apertures 120A and the shape of the cutting insert 104 cooperate to ensure the cutting insert 104 is at an appropriate orientation to bevel the end 56 of the first cut piece P1 of the pipe at an appropriate angle α. In the illustrated example, these elements cooperate to ensure the cutting insert 104 bevels the end 56 of the first cut piece P1 of the pipe at about a 30-degree angle (i.e., α=about 30 degrees). The cutting insert 104 may also be rotated 180 degrees to bring the first cutting edge 132 of the cutting insert 104 into engagement with the engagement surface 116A of the lip 112A. Again, the lip 112A, the engagement surface 116A, the location of the coupling apertures 120A and the shape of the cutting insert 104 cooperate to ensure the cutting insert 104 is at an appropriate orientation to bevel the end 56 of the first cut piece P1 of the pipe at an appropriate angle α (e.g., α=about 30 degrees). The two cutting edges 136, 132 may provide the cutting insert 104 with additional life compared to a cutting insert that only includes one cutting edge.

The cutting insert 104 is the portion of the cutting tool 53A that engages, cuts and bevels the pipe P. Thus, the cutting insert 104 may be made of a material appropriate for cutting a pipe P while the base 100A of the cutting tool 53A may be made of a different material. The material from which the cutting insert 104 is made may be more expensive of a material than the material from which the base 100A is made. Typical cutting tools may be made completely of the material required to cut a pipe. Thus, the total cost of the cutting tool 53A may be reduced from past cutting tools made completely of a material required to cut a pipe.

Figure 5:
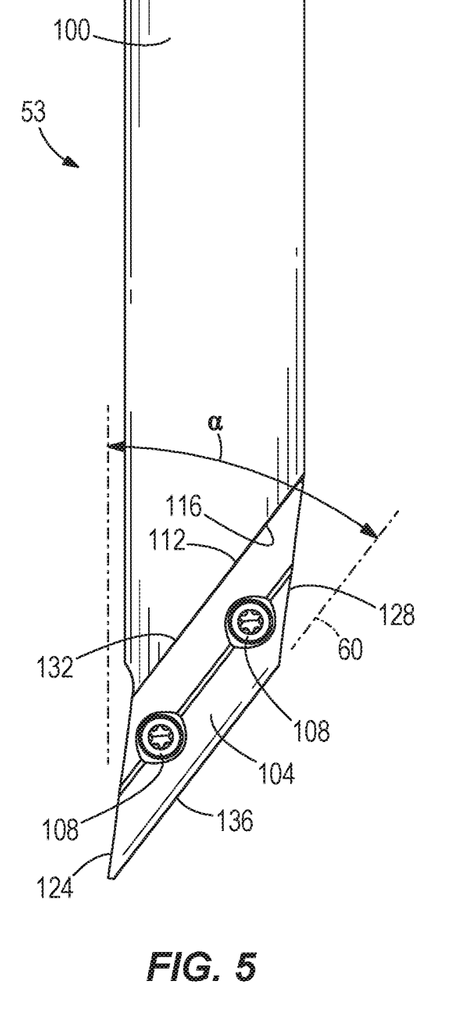
FIG. 5 is an elevational view of one example of a cutting tool configured to be included in the pipe machining apparatus shown in FIG. 1, according to one aspect of the present disclosure.

Referring now to FIG. 5, the tool 53 is illustrated and is configured to bevel an end 56 of a first cut piece P1 of the pipe. Tools 53 and 53A may be interchangeably coupled to the tool support 48 to bevel an end 56 of the first cut piece P1 of the pipe at various angles α or θ. In some examples, the bevel cut into the end 56 of the first cut piece P1 of pipe by the tool 53 may be referred to as an inside bevel and tool 53 may be referred to as an inside bevel tool. In the illustrated example, the tool 53 includes a base 100 and the cutting insert 104 coupled to the base 100. The cutting insert 104 is the same cutting insert 104 that is coupled to the base 100A of the tool 53A. Thus, the cutting insert 104 is configured to be interchangeably coupled to either the base 100A of tool 53A or the base 100 of tool 53. In this manner, only one cutting insert 104 is required to bevel the end 56 of the first cut piece P1 of the pipe at varying angles α, θ and along various transverse planes 60, 60A.

While the drawings illustrate the cutting insert 104 being configured to couple to two bases 100, 100A, it should be understood that the cutting insert 104 may be coupled to any number of bases in order to bevel an end of a pipe at any number of different angles. In this manner, the present disclosure provides any number of cutting tools to bevel an end of a pipe at any number of angles.

The cutting insert 104 is coupled to the base 100 of tool 53 in a similar manner to the base 100A of tool 53A since the cutting insert 104 is the same. That is, in the illustrated example, the cutting insert 104 is coupled to the base 100 with the two coupling members or fasteners 108. The same alternative examples described above in connection with coupling the cutting insert 104 to the base 100A of tool 53A also apply to coupling the cutting insert 104 to the base 100 of tool 53 since the cutting insert 104 is coupled similarly to both the base 100A of tool 53A and the base 100 of tool 53. The base 100 of tool 53 also defines a projection or lip 112 having an engagement surface 116 that is configured to be engaged by the cutting insert 104. The base 100 also defines coupling apertures 120 therein configured to receive the coupling members 108 therein.

With continued reference to FIG. 5, the lip 112, the engagement surface 116, the location of the coupling apertures 120 and the shape of the cutting insert 104 cooperate to ensure the cutting insert 104 is at an appropriate orientation to bevel the end 56 of the first cut piece P1 of the pipe at an appropriate angle θ. In the illustrated example, these elements cooperate to ensure the cutting insert 104 bevels the end 56 of the first cut piece P1 of the pipe at about a 37.5-degree angle (i.e., θ=about 37.5 degrees). The cutting insert 104 may also be rotated 180 degrees to bring the second cutting edge 136 of the cutting insert 104 into engagement with the engagement surface 116 of the lip 112. Again, the lip 112, the engagement surface 116, the location of the coupling apertures 120 and the shape of the cutting insert 104 cooperate to ensure the cutting insert 104 is at an appropriate orientation to bevel the end 56 of the first cut piece P1 of the pipe at an appropriate angle θ (e.g., θ=about 37.5 degrees).

Figure 6:
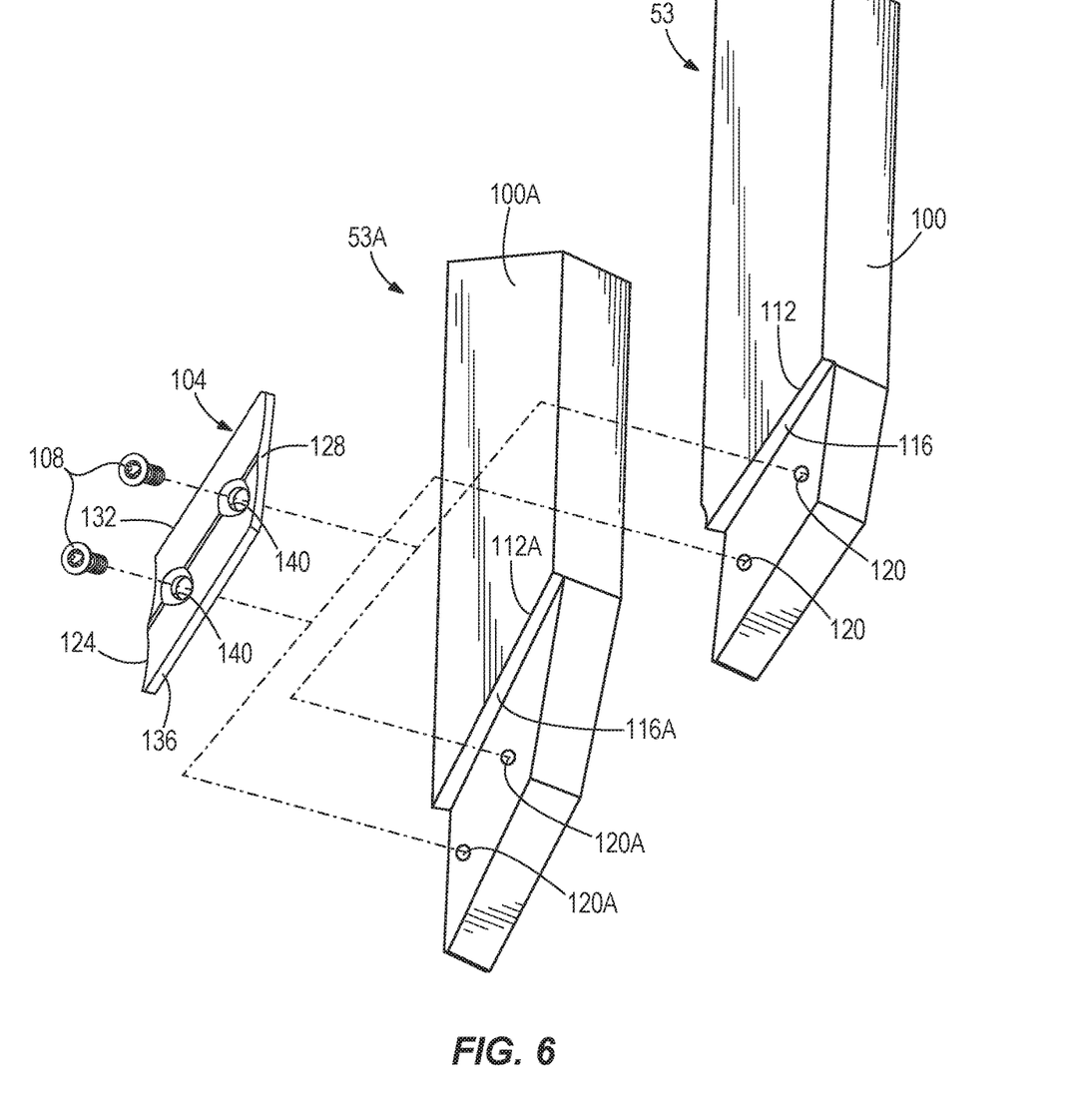
FIG. 6 is an exploded view of the cutting tools shown in FIGS. 4 and 5 with one example of an interchangeable cutting insert, according to one aspect of the present disclosure.

Referring now to FIG. 6, the cutting insert 104 is illustrated in a manner that demonstrates interchangeable coupling of the cutting insert 104 with either the base 100A of tool 53A or the base 100 of cutting tool 53. The elements of the bases 100, 100A and the cutting insert 104 position the cutting insert 104 in the appropriate orientation to bevel the end 56 of the first cut piece P1 of pipe at multiple angles α, θ and along multiple planes 60, 60A transverse to the longitudinal axis A of the pipe P.

Figure 7:
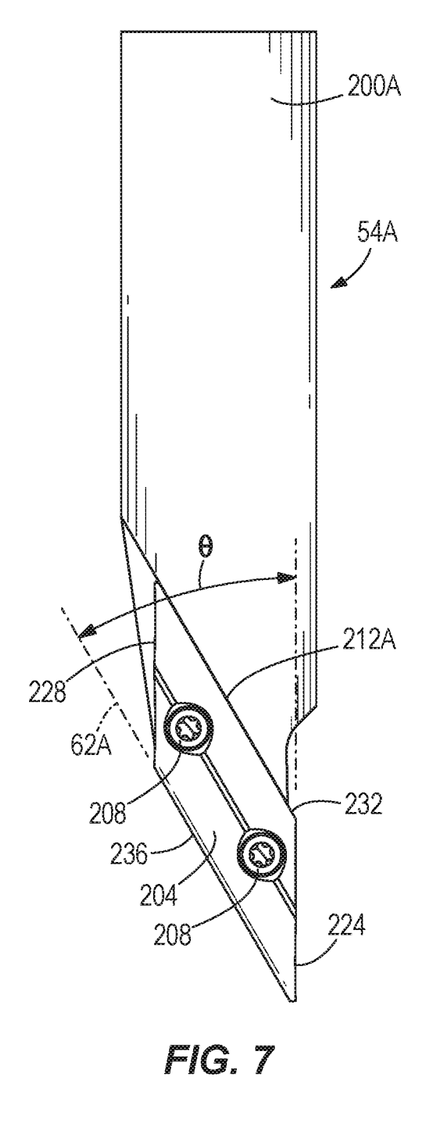
FIG. 7 is an elevational view of one example of a cutting tool configured to be included in the pipe machining apparatus shown in FIG. 1, according to one aspect of the present disclosure.

Referring now to FIG. 7, the tool 54A is illustrated and is configured to bevel an end 58 of a second cut piece P2 of the pipe. In some examples, the bevel cut into the end 58 of the second cut piece P2 of pipe may be referred to as an outside bevel and tool 54A may be referred to as an outside bevel tool. In the illustrated example, the tool 54A includes a base 200A and a cutting insert 204 coupled to the base 200A. The cutting insert 204 may be coupled to the base 200A in a variety of manners and all of such manners are intended to be within the spirit and scope of the present disclosure. In the illustrated example, the cutting insert 204 is coupled to the base 200A with two coupling members or fasteners 208. In other examples, the cutting insert 204 may be coupled to the base 200A using any number of fasteners 208 and all of such possibilities are intended to be included in the spirit and scope of the present disclosure. The base 200A defines a projection or lip 212A having an engagement surface 216A that is configured to be engaged by the cutting insert 204. The base 200A also defines coupling apertures 220A therein configured to receive the coupling members 208 therein. Similarly to the alternative examples associated with the coupling members 208, the base 200A may include any number of coupling apertures 220A to correspond to the number of coupling members 208.

With continued reference to FIG. 7, the cutting insert 204 includes a first cutting edge 236, a second cutting edge 232 positioned opposite the first cutting edge 236, and third and fourth edges 224, 228 opposite each other and between the first and second cutting edges 236, 232. In the illustrated example, the first and second cutting edges 236, 232 are generally parallel to each other and the third and fourth edges 224, 228 are generally parallel to each other. In other examples, the edges of the cutting insert 204 may be oriented differently relative to each other and all of such possibilities are intended to within the spirit and scope of the present disclosure. The cutting insert 204 also defines apertures 240 there through that are alignable with coupling apertures 220A defined in the base 200A. The coupling members 208 are positionable in the aligned apertures 220A, 240 to couple the insert 204 to the base 200A. Similarly to the alternative examples associated with the coupling members 208 and coupling apertures 220A of the base 200A, the cutting insert 204 may include any number of apertures 240 to correspond to the number of coupling members 208 and coupling apertures 220A in the base 200A.

In the illustrated example, the second cutting edge 232 of the cutting insert 204 engages the engagement surface 216A of the base 200A. The lip 212A, the engagement surface 216A, the location of the coupling apertures 220A and the shape of the cutting insert 204 cooperate to ensure the cutting insert 204 is at an appropriate orientation to bevel the end 58 of the second cut piece P2 of the pipe at an appropriate angle α. In the illustrated example, these elements cooperate to ensure the cutting insert 204 bevels the end 58 of the second cut piece P2 of the pipe at about a 30-degree angle (i.e., α=about 30 degrees). The cutting insert 204 may also be rotated 180 degrees to bring the first cutting edge 236 of the cutting insert 204 into engagement with the engagement surface 216A of the lip 212A. Again, the lip 212A, the engagement surface 216A, the location of the coupling apertures 220A and the shape of the cutting insert 204 cooperate to ensure the cutting insert 204 is at an appropriate orientation to bevel the end 58 of the second cut piece P2 of the pipe at an appropriate angle α (e.g., α=about 30 degrees). The two cutting edges 236, 232 may provide the cutting insert with additional life compared to a cutting insert that only includes one cutting edge.

The cutting insert 204 is the portion of the cutting tool 54A that engages, cuts and bevels the pipe P. Thus, the cutting insert 204 may be made of a material appropriate for cutting a pipe P while the base 200A of the cutting tool 54A may be made of a different material. The material from which the cutting insert 204 is made may be more expensive of a material than the material from which the base 200A is made. Typical cutting tools may be made completely of the material required to cut a pipe. Thus, the total cost of the cutting tool 54A may be reduced from past cutting tools made completely of a material required to cut a pipe P.

Figure 8:
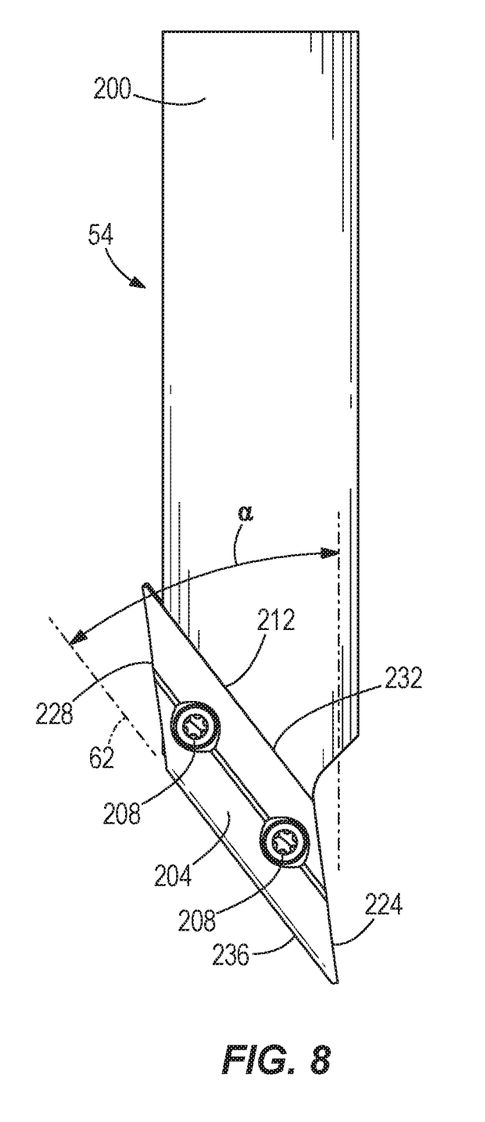
FIG. 8 is an elevational view of one example of a cutting tool configured to be included in the pipe machining apparatus shown in FIG. 1, according to one aspect of the present disclosure.

Referring now to FIG. 8, the tool 54 is illustrated and is configured to bevel an end 58 of a second cut piece P2 of the pipe. Tools 54 and 54A may be interchangeably coupled to the tool support 48 to bevel an end 58 of the second cut piece P2 of the pipe at various angles α or θ. In some examples, the bevel cut into the end 58 of the second cut piece P2 of pipe by the tool 54 may be referred to as an outside bevel and tool 54 may be referred to as an outside bevel tool. In the illustrated example, the tool 54 includes a base 200 and the cutting insert 204 coupled to the base 200. The cutting insert 204 is the same cutting insert 204 that is coupled to the base 200A of the tool 54A. Thus, the cutting insert 204 is configured to be interchangeably coupled to either the base 200A of tool 54A or the base 200 of tool 54. In this manner, only one cutting insert 204 is required to bevel the end 58 of the second cut piece P2 of the pipe at varying angles α, θ and along various transverse planes 62, 62A.

The cutting insert 204 is coupled to the base 200 of tool 54 in a similar manner to the base 200A of tool 54A since the cutting insert 204 is the same. That is, in the illustrated example, the cutting insert 204 is coupled to the base 200 with two coupling members or fasteners 208. The same alternative examples described above in connection with coupling the cutting insert 204 to the base 200A of tool 54A also apply to coupling the cutting insert 204 to the base 200 of tool 54 since the cutting insert 204 is coupled similarly to both the base 200A of tool 54A and the base 200 of tool 54. The base 200 of tool 54 also defines a projection or lip 212 having an engagement surface 216 that is configured to be engaged by the cutting insert 204. The base 200 also defines coupling apertures 220 therein configured to receive the coupling members 208 therein.

With continued reference to FIG. 8, the lip 212, the engagement surface 216, the location of the coupling apertures 220 and the shape of the cutting insert 204 cooperate to ensure the cutting insert 204 is at an appropriate orientation to bevel the end 58 of the second cut piece P2 of the pipe at an appropriate angle θ. In the illustrated example, these elements cooperate to ensure the cutting insert 204 bevels the end 58 of the second cut piece P2 of the pipe at about a 37.5-degree angle (i.e., θ=about 37.5 degrees). The cutting insert 204 may also be rotated 180 degrees to bring the first cutting edge 236 of the cutting insert 204 into engagement with the engagement surface 216 of the lip 212. Again, the lip 212, the engagement surface 216, the location of the coupling apertures 220 and the shape of the cutting insert 204 cooperate to ensure the cutting insert 204 is at an appropriate orientation to bevel the end 58 of the second cut piece P2 of the pipe at an appropriate angle θ (e.g., θ=about 37.5 degrees).

Figure 9:
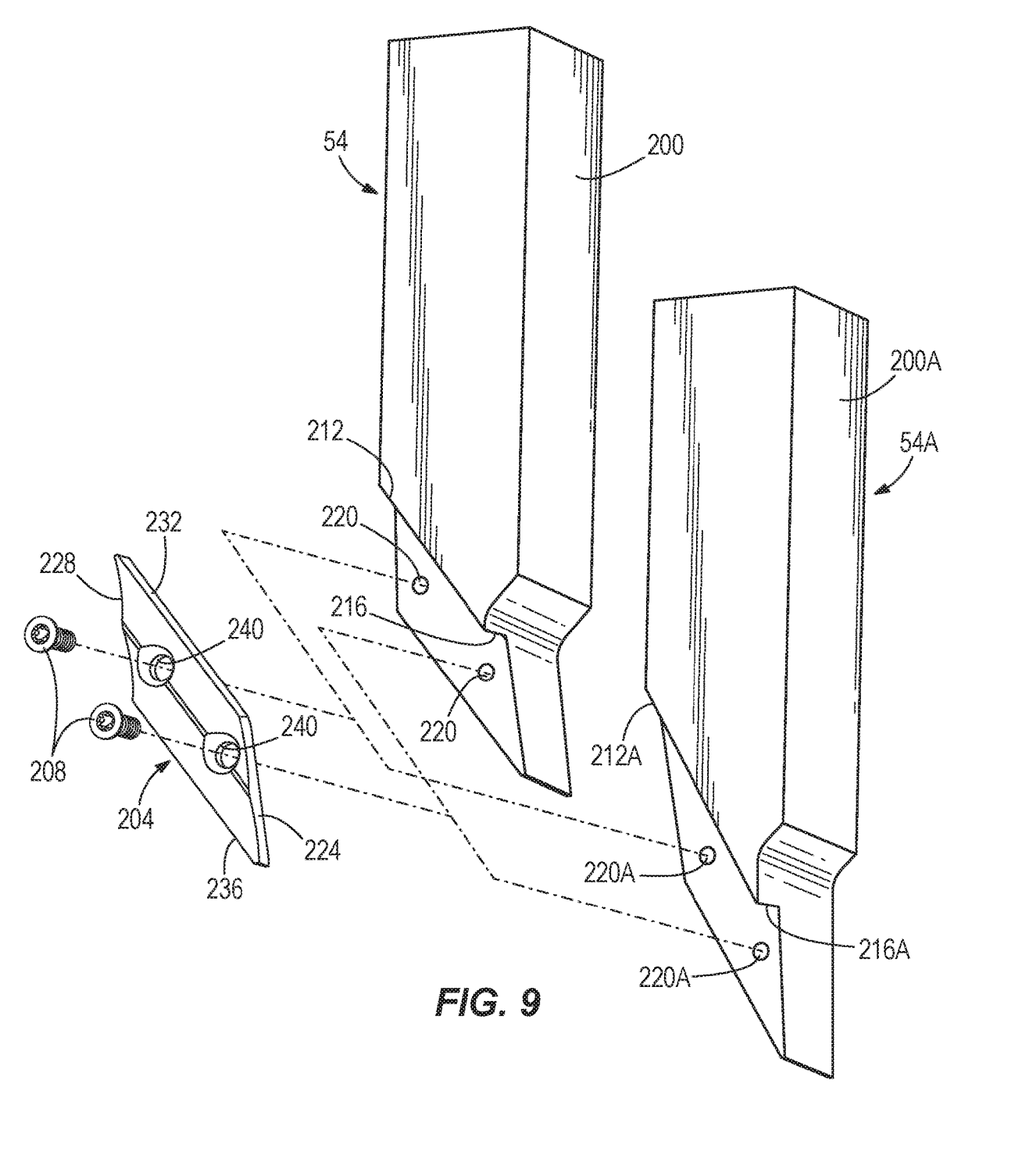
FIG. 9 is an exploded view of the cutting tools shown in FIGS. 7 and 8 with one example of an interchangeable cutting insert, according to one aspect of the present disclosure.

Referring now to FIG. 9, the cutting insert 204 is illustrated in a manner that demonstrates interchangeable coupling of the cutting insert 204 with either the base 200A of tool 54A or the base 200 of cutting tool 54. The elements of the bases 200, 200A and the cutting insert 204 position the cutting insert 204 in the appropriate orientation to bevel the end 58 of the second cut piece P2 of pipe at multiple angles α, θ and along multiple planes 62, 62A transverse to the longitudinal axis A of the pipe P.

It should be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the pipe machining apparatus and cutting tools may be utilized in any orientation and use of such terms is intended to correspond to the exemplary orientation of the pipe machining apparatus and cutting tools illustrated in the drawings. The use of these terms in association with the pipe machining apparatus and cutting tools is not intended to limit the pipe machining apparatus and cutting tools to a single orientation or to limit the pipe machining apparatus and cutting tools in any manner.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, inventive subject matter lies in less than all features of a single disclosed embodiment.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A pipe cutting assembly for cutting a pipe comprising:
   a circular frame comprising a circular frame outer surface comprising a first outer diameter;
   a clamp directly attached to the circular frame outer surface, the clamp configured to secure the circular frame to the pipe;
   a circular tool carrier comprising a circular tool carrier outer surface comprising a second outer diameter smaller than the first outer diameter, the tool carrier rotatably coupled to and disposed completely within an inner aperture of the frame in concentric alignment with the frame, the tool carrier rotatable relative to the frame around an axis;
   a tool support coupled to and rotatable with the tool carrier relative to the frame around the axis;
   a first base made of a first single piece of material, the first base comprising a first base engagement surface and a first coupling aperture;
   a second base made of a second single piece of material, the second base comprising a second base engagement surface having a different angular orientation than the first base engagement surface of the first base relative to a longitudinal axis of the respective first and second bases, and a second coupling aperture;
   a cutting insert comprising an insert aperture and first, second, third, and fourth edges, the first and second edges opposed to one another, and the third and fourth edges opposed to one another, the first edge comprising a first cutting edge; and
   a coupling member;
   wherein in a first configuration the second base is detached from the tool support while the first base is directly attached to the tool support and rotatable around the axis with the tool support, the coupling member is inserted into the insert aperture of the cutting insert and the first coupling aperture of the first base securing the cutting insert to the first base with the second edge of the cutting insert directly abutted against the first base engagement surface of the first base in parallel alignment, while the first, third, and fourth edges of the cutting insert do not contact any retaining member;

wherein in a second configuration the first base is detached from the tool support while the second base is directly attached to the tool support and rotatable around the axis with the tool support, the coupling member is inserted into the insert aperture of the cutting insert and the second coupling aperture of the second base securing the cutting insert to the second base with the second edge of the cutting insert directly abutted against the second base engagement surface of the second base in parallel alignment, while the first, third, and fourth edges of the cutting insert do not contact any retaining member;

the first cutting edge of the cutting insert oriented at different cutting angles in the first and second configurations.

2. The pipe cutting assembly of claim 1, wherein the cutting insert is in a parallelogram shape.

3. The pipe cutting assembly of claim 1, wherein the second edge of the cutting insert comprises a second cutting edge.

4. The pipe cutting assembly of claim 3, wherein in a third configuration the second base is detached from the tool support while the first base is directly attached to the tool support and rotatable around the axis with the tool support, the coupling member is inserted into the insert aperture of the cutting insert and the first coupling aperture of the first base securing the cutting insert to the first base with the first cutting edge of the cutting insert directly abutted against the first base engagement surface of the first base in parallel alignment, while the second, third, and fourth edges of the cutting insert do not contact any retaining member.

5. The pipe cutting assembly of claim 4, wherein in a fourth configuration the first base is detached from the tool support while the second base is directly attached to the tool support and rotatable around the axis with the tool support, the coupling member is inserted into the insert aperture of the cutting insert and the second coupling aperture of the second base securing the cutting insert to the second base with the first cutting edge of the cutting insert directly abutted against the second base engagement surface of the second base in parallel alignment, while the second, third, and fourth edges of the cutting insert do not contact any retaining member.

6. The pipe cutting assembly of claim 5, wherein the second cutting edge of the cutting insert is oriented at different cutting angles in the third and fourth configurations.

7. The pipe cutting assembly of claim 1, wherein the first base engagement surface of the first base extends linearly from a first exterior surface of the first base to a second exterior surface of the first base.

8. The pipe cutting assembly of claim 7, wherein the second base engagement surface of the second base extends linearly from a first exterior surface of the second base to a second exterior surface of the second base.

9. The pipe cutting assembly of claim 1, wherein a portion of the clamp extends through an opening in the circular frame outer surface into the inner aperture of the frame.

10. The pipe cutting assembly of claim 1, further comprising a column directly attached to the circular frame outer surface, the column housing a gear train, the gear train coupled to a motor, the motor configured to rotate the tool carrier relative to the frame through the gear train.

11. The pipe cutting assembly of claim 1, further comprising a plurality of the coupling member, the first base comprising a plurality of the first coupling aperture, the second base comprising a plurality of the second coupling aperture, the cutting insert comprising a plurality of the aperture, in the first configuration each of the coupling members is inserted into a respective one of the insert apertures of the cutting insert and a respective one of the first coupling apertures of the first base, and in the second configuration each of the coupling members is inserted into a respective one of the insert apertures of the cutting insert and a respective one of the second coupling apertures of the second base.

* * * * *